United States Patent
Qian et al.

(10) Patent No.: US 10,273,013 B1
(45) Date of Patent: Apr. 30, 2019

(54) PREFERRED BREAK POINTS AND PATHS IN AIRFRAMES FOR BALLISTIC PARACHUTE SYSTEMS

(71) Applicant: Kitty Hawk Corporation, Mountain View, CA (US)

(72) Inventors: Amy Qian, Sunnyvale, CA (US); Damon Vander Lind, East Palo Alto, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 16/155,609

(22) Filed: Oct. 9, 2018

(51) Int. Cl.
| | | |
|---|---|---|
| *B64D 17/72* | (2006.01) | |
| *B29C 70/30* | (2006.01) | |
| *B64D 17/80* | (2006.01) | |
| *B64C 27/00* | (2006.01) | |
| *B29L 12/00* | (2006.01) | |
| *B64D 17/04* | (2006.01) | |

(52) U.S. Cl.
CPC ............ *B64D 17/725* (2013.01); *B29C 70/30* (2013.01); *B64D 17/80* (2013.01); *B29L 2012/00* (2013.01); *B64C 27/006* (2013.01); *B64D 17/04* (2013.01)

(58) Field of Classification Search
CPC ...... B64D 17/725; B64D 17/80; B64C 27/006
USPC ......................................................... 244/139
See application file for complete search history.

(56) References Cited

U.S. PATENT DOCUMENTS

| | | | | |
|---|---|---|---|---|
| 3,796,398 | A * | 3/1974 | Eilertson | B64D 17/80 244/139 |
| 4,496,122 | A * | 1/1985 | Whipple | B64D 17/80 244/139 |
| 6,565,041 | B1 * | 5/2003 | Young | B64C 39/024 244/139 |
| 7,487,939 | B1 * | 2/2009 | Christof | B64D 17/80 244/139 |
| 8,366,052 | B1 * | 2/2013 | Lutke | B64G 1/002 244/123.11 |
| 2003/0057327 | A1 * | 3/2003 | Carroll | B64C 39/024 244/139 |
| 2007/0145193 | A1 * | 6/2007 | Hakki | B64D 17/80 244/139 |
| 2008/0142635 | A1 * | 6/2008 | Manfredi | B64D 25/00 244/1 R |
| 2012/0312911 | A1 * | 12/2012 | Heppe | B64B 1/06 244/2 |
| 2013/0221159 | A1 * | 8/2013 | Giannakopoulos | B64C 13/30 244/139 |
| 2017/0225792 | A1 * | 8/2017 | Wang | B64D 17/70 |
| 2018/0009539 | A1 * | 1/2018 | Robertson | B64D 17/725 |

FOREIGN PATENT DOCUMENTS

WO  WO-2017139803 A1 *  8/2017  ............. B64D 17/72

* cited by examiner

*Primary Examiner* — Christopher P Ellis
(74) *Attorney, Agent, or Firm* — Van Pelt, Yi & James LLP

(57) ABSTRACT

A preferred break point is provided in the airframe, where there is a ballistic parachute system which includes a rocket which sits in a rocket canister and a canopy which sits in a canopy canister. The airframe includes a composite material and covers the ballistic parachute system. The preferred break point is located in the airframe over the opening of the rocket canister. A preferred break path is provided in the airframe located at least partially over the opening of the rocket canister and at least partially over the opening of the canopy canister.

21 Claims, 9 Drawing Sheets

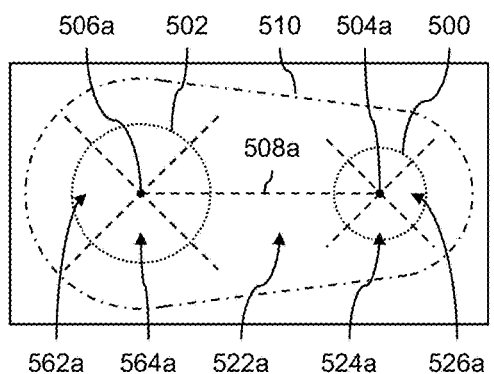
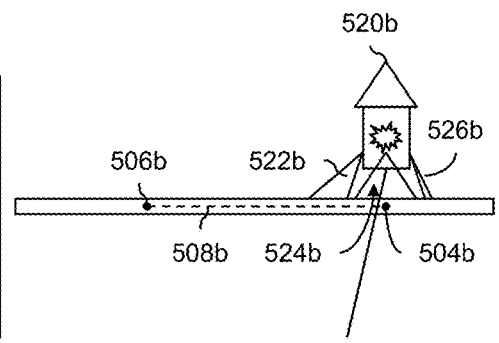
FIG. 5A    FIG. 5B
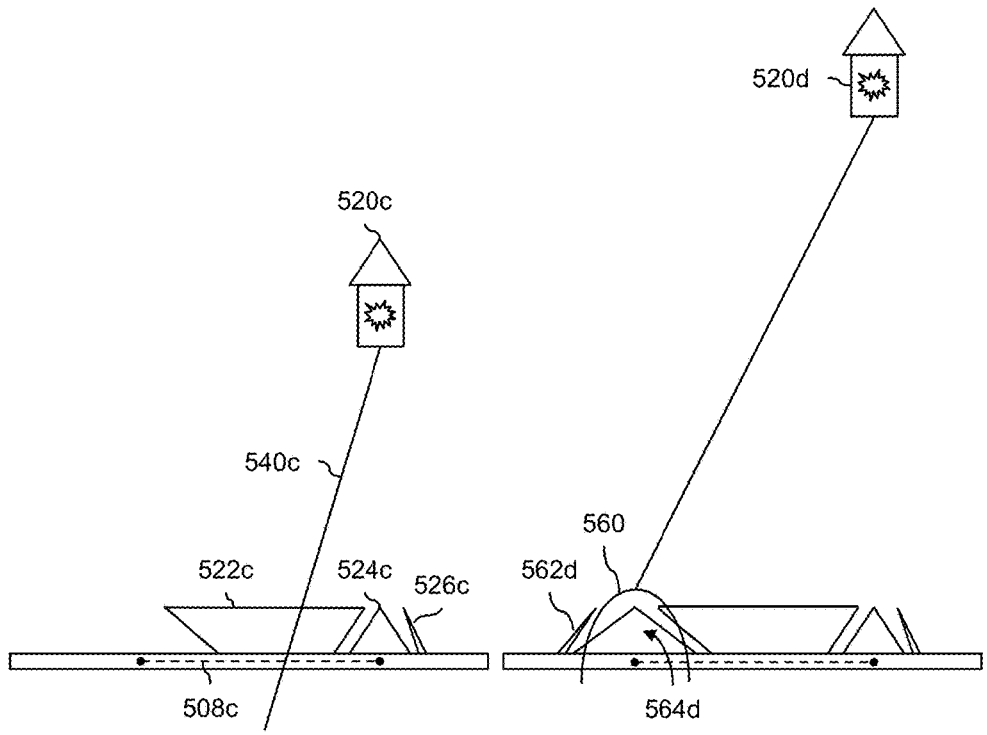
FIG. 5C    FIG. 5D

PREFERRED BREAK POINTS AND PATHS IN AIRFRAMES FOR BALLISTIC PARACHUTE SYSTEMS

BACKGROUND OF THE INVENTION

New types of aircraft are being developed which have different design constraints compared to conventional aircraft. For example, they may be shaped differently, be much smaller than conventional aircraft, and/or be ultralight vehicles with very strict weight limitations compared to conventional aircraft. As such, new techniques to integrate or otherwise combine new combinations of features and/or which satisfy new design limitations and/or constraints may be required.

BRIEF DESCRIPTION OF THE DRAWINGS

Various embodiments of the invention are disclosed in the following detailed description and the accompanying drawings.

FIG. 5A is a top view showing an embodiment of a composite material with two preferred break points.

FIG. 5B is a side view showing an embodiment a composite material with two preferred break points after a rocket has broken through.

FIG. 5C is a side view showing an embodiment of a composite material as a rocket-canopy line breaks through a preferred break path which ends at two preferred break points.

FIG. 5D is a side view showing an embodiment of a composite material after a canopy breaks through.

DETAILED DESCRIPTION

Figure 1:
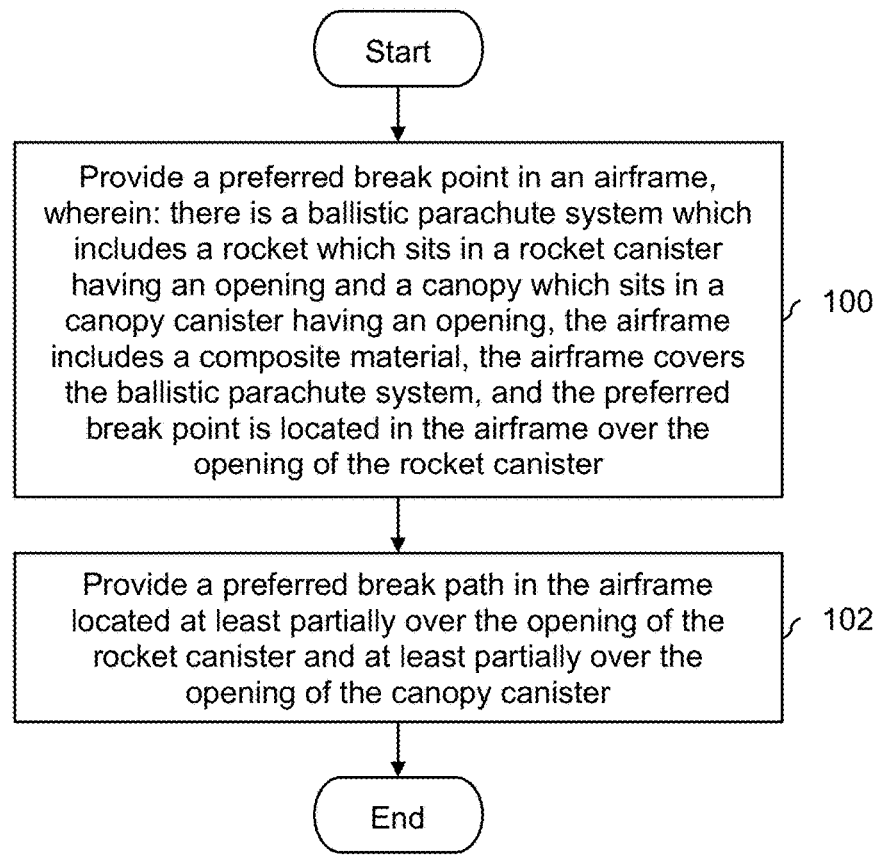
FIG. 1 is a flowchart illustrating an embodiment of a process to provide an airframe which can more easily break when a ballistic parachute system is ignited.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of airframes made of composite material which are processed and/or manufactured in a way to enable a ballistic parachute system to break through the airframe when ignited are described herein. For example, new types of ultralight multicopters are being developed. Unlike wing-borne flight vehicles which generate an aerodynamic lift force due to the shape of the airfoil (i.e., wing), the lift in such multicopters is generated entirely through thrust from the rotors. To put it another way, such multicopters do not have wings and therefore cannot land by gliding in the event of an emergency.

To address emergency landings, parachute systems are being integrated into such vehicles. One issue with these types of multicopters is that they fly at low altitudes (e.g., on the order of 100 feet in the air). More specifically they hover, which is more dangerous because when a failure occurs there will be less relative air motion to inflate a parachute system. To more quickly inflate the canopy, a ballistic parachute system may be used where one or more rockets help to inflate the canopy by pulling on the canopy. At such low altitudes, a non-ballistic parachute system may not be able to inflate the canopy quickly enough and the non-ballistic parachute system may insufficiently slow down the vehicle's descent. In some embodiments described herein, multiple small(er) parachutes (e.g., three) are used instead of a single large(r) parachute because this significantly improves (i.e., reduces) the inflation time. Fill rate is largely related to the volume under a canopy, while drag is largely related to the projected area. With multiple small(er) parachutes, the drag of a single large(r) canopy can be achieved but with lower fill time. The main penalty to this strategy is the added complexity of managing multiple canopies. However, for many applications (including the exemplary applications described herein) the combination of reduced fill time and redundancy (e.g., in case a single parachute malfunctions) make this a worthwhile tradeoff. In some embodiments, the packing of the canopy also helps to reduce inflation time.

Another design consideration and/or limitation with such a vehicle is the extremely strict weight limitation. Some other types of aircraft have an acrylic panel or section in the airframe located where the ballistic parachute system will break through the airframe. Acrylic is easy to shatter (which is good for egress of the parachute system) but acrylic is heavy and is therefore an undesirable material to use on an ultralight vehicle. In general, it would be desirable if all or most of an ultralight vehicle's airframe could be made of a lightweight material, such as a composite material.

Another design consideration and/or limitation with such a vehicle is the very low clearance between the rocket and the airframe. The compartment or space inside the vehicle where the ballistic parachute system resides may have very little space between the rocket and the part of the airframe the rocket needs to break through. This means that the rocket may have built up relatively little kinetic energy to break through the airframe.

To address the above design considerations and/or limitations, in some embodiments, a vehicle has a preferred break point in a composite material where the airframe surrounds a ballistic parachute system. The ballistic parachute system includes a rocket which sits in a rocket canister having an opening and a canopy which sits in a canopy canister having an opening. The preferred break point is located in the composite material over the opening of the rocket canister. As will be described in more detail below, this may help to reduce the amount of kinetic energy expended by the rocket to break through the airframe. In some embodiments, the airframe has features to help in some other manner (e.g., don't tear or snag a line or the canopy in the ballistic parachute system, keep the flight path or angle of the rocket within some desired window or range of angles, etc.). Even if an aircraft is capable of wing-borne flight, the embodiments of the parachute system described herein may be useful (e.g., a parachute system is useful for vehicles which have a multicopter mode or configuration).

FIG. 1 is a flowchart illustrating an embodiment of a process to provide an airframe which can more easily break when a ballistic parachute system is ignited. As will be described in more detail below, airframes made of composite material with a preferred break point and a preferred break path over the opening of a rocket canister and/or over the opening of a canopy canister are easier to break, which is desirable for a variety of reasons.

At 100, a preferred break point in an airframe is provided, wherein: there is a ballistic parachute system which includes a rocket which sits in a rocket canister having an opening and a canopy which sits in a canopy canister having an opening, the airframe includes a composite material, the airframe covers the ballistic parachute system, and the preferred break point is located in the airframe over the opening of the rocket canister. The following figure shows an example of a ballistic parachute system and a preferred break point.

Figure 2A:
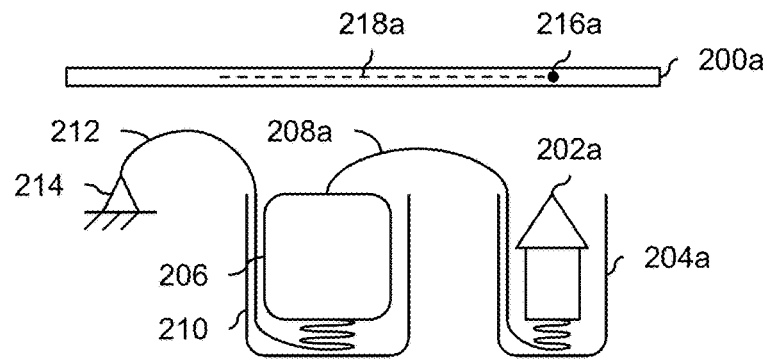
FIG. 2A is a side view illustrating an embodiment of a preferred break point and a preferred break path in a composite material which covers a ballistic parachute system.

FIG. 2A is a side view illustrating an embodiment of a preferred break point and a preferred break path in a composite material which covers a ballistic parachute system. In the example shown, composite material 200a is used to form the airframe of a vehicle. For clarity, only part of the airframe (i.e., the part that covers the ballistic parachute) is shown.

The ballistic parachute system includes a rocket (202a) which sits in a container or canister (204a) that is enclosed on the sides and bottom and is open at the top (i.e., towards composite 200a). The rocket (202a) is detachably coupled to a canopy (206) via a line (208a). Initially, the rocket is used to inflate the canopy and line (208a) couples the rocket and canopy. Once the canopy is inflated (or nearly inflated), the line is cut or otherwise separated in some manner. Line 208a is sometimes referred to herein as a rocket-canopy line to differentiate that line from other lines.

The canopy (206) sits inside of a second container or canister (210) which, like the rocket canister (204a), is enclosed on the sides and bottom and is open at the top. A second, non-detachable line (212) secures or otherwise couples the canopy (206) to an anchor point (214) on the airframe.

In one example application, a single-seat, ultralight aircraft with a composite airframe has a ballistic parachute system stored in the airframe. As a result of the relatively small dimensions of the exemplary aircraft, the composite material (200a) is very close to the rocket (202a), for example on the order of inches (e.g., one prototype has clearance on the order of 1.5 inches) as opposed to feet. As a result, when the rocket (202a) is ignited, the rocket will have built up relatively little kinetic energy before making contact with the composite material (200a).

To help the rocket (with relatively little kinetic energy) break through the composite material, the composite material is manufactured or otherwise processed in such a way so that there is a preferred break point (216a) in the composite material at or near where the rocket (e.g., first) makes contact with the composite material. Due to the presence of the preferred break point, the rocket will not have to expend as much kinetic energy to break through the composite material. Conceptually, a preferred break point may be thought of as a structurally weaker point in the composite material where a break is intended or otherwise desired to occur. As will be described in more detail below, the preferred break point may be introduced or otherwise incorporated into the composite material at that location using a variety of techniques. As a result of the savings in kinetic energy due to the preferred break point, when the rocket is manufactured, less fuel has to be included in the rocket which in turn keeps costs and/or weight down. To put it another way, if the rocket is held constant, the reliability of the rocket successfully piercing the hatch is increased with preferred break points and/or preferred break paths.

Returning to FIG. 1, at 102, a preferred break path in the airframe located at least partially over the opening of the rocket canister and at least partially over the opening of the canopy canister is provided. The following figure shows an example of this.

Figure 2B:
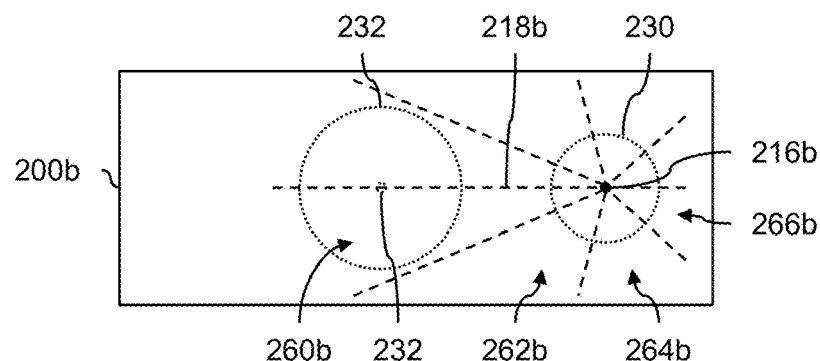
FIG. 2B is a top view illustrating an embodiment of a preferred break point and a preferred break path in a composite material which covers a ballistic parachute system.

FIG. 2B is a top view illustrating an embodiment of a preferred break point and a preferred break path in a composite material which covers a ballistic parachute system. FIG. 2B continues the example of FIG. 2A but for clarity and readability only preferred break path 218a is shown in FIG. 2A and other preferred break paths are not shown in that figure. To provide context, dotted circle 230 in FIG. 2B shows where the opening of rocket canister 204a in FIG. 2A is located and dotted circle 232 shows where the opening of canopy canister 210 in FIG. 2A is located. In this example, the composite material (200b) does not include a preferred break path at the dotted circles. That is, dotted circles 230 and 232 are shown strictly to indicate where the rocket canister and canopy canister are located beneath composite material 200b.

The exemplary composite material shown here has eight preferred break paths which radiate outward from preferred break point 216b. One of those preferred break paths is preferred break path 218b which passes through the preferred break point (216b) (i.e., at the center of the rocket canister opening) and the center of the canopy canister (234). As shown herein, in some embodiments, the preferred break path runs through: (1) a first center line associated with the rocket canister and (2) a second center line associated with the canopy canister. In some such embodiments, the preferred break path extends beyond one or more of the following: the first center line or the second center line (as is shown in FIG. 2B). Alternatively, a preferred break path may terminate at the center line that runs through a canister.

In some embodiments, a preferred break point (such as preferred break point 216b) is formed by the intersection of two or more preferred break paths. That is, a separate or distinct "hole" does not need to be drilled or formed in order to create a preferred break point. Rather, two or more preferred break paths are intersected at a point where the preferred break point is desired to be and the intersection of those lines naturally creates the preferred break point.

When the rocket (not shown in FIG. 2B) is ignited, the tip of the rocket will make contact with the composite material (200b) at or near preferred break point 216b, causing a break in the composite material at that point. As the rocket continues to push upwards, the break or tear in the composite material will continue along the preferred break paths (e.g., radiating outwards). This causes triangular "petals" or flaps formed by the preferred break path to peel or otherwise bend back from the center. The following figure shows an example of this.

Figure 2C:
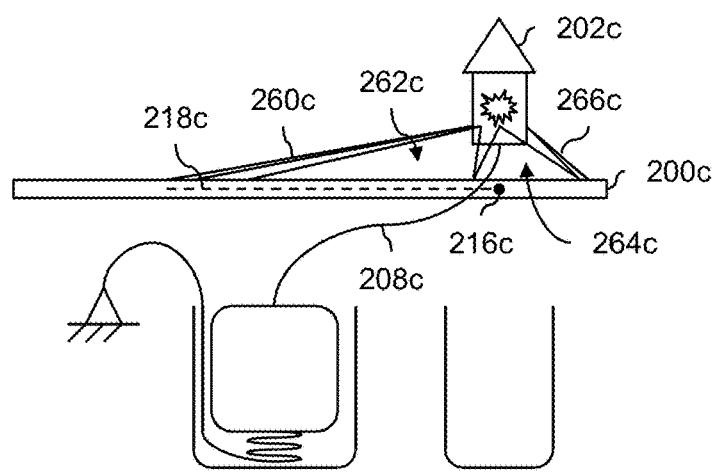
FIG. 2C is a side view illustrating an embodiment of a composite material after a rocket has broken through the composite material using a preferred break point and preferred break paths.

FIG. 2C is a side view illustrating an embodiment of a composite material after a rocket has broken through the composite material using a preferred break point and preferred break paths. FIG. 2C continues the examples shown in FIG. 2A and FIG. 2B. In the state shown here, the rocket (202c) has ignited and has broken through the composite material (200c), starting at preferred break point 216c. The rocket (202c) pulls on the rocket-canopy line (208c) which tears through the composite material along preferred break path 218c if needed (e.g., if the composite material has not already torn along that part of the preferred break path). As a result of the preferred break paths, the composite material breaks along those lines, forming (in this example) eight triangular flaps, including flaps 260c, 262c, 264c, and 266c. In FIG. 2B, those flaps are shown respectively as flaps 260b, 262b, 264b, and 266b.

It is noted that the preferred break paths extend sufficiently outwards so that the flaps (e.g., flaps 260b, 262b, 264b, and 266b in FIG. 2B) formed by the preferred break paths expose the entirety of the opening of the rocket canister (230 in FIG. 2B) and canopy canister (232 in FIG. 2B). Blocking the opening of either canister may be undesirable (e.g., because it unnecessarily consumes kinetic energy from the ignited rocket, may snag the canopy, etc.) and therefore preferred break paths which are positioned and/or long enough to expose all or as much as possible of the opening of the canisters are desirable.

As shown here, in some embodiments, the preferred break path runs through a first center line extending from a center of the rocket canister (216b) and a second center line extending from a center of the canopy canister (232). Furthermore, in some such embodiments, not only does the preferred break path run through a first center line and a second center line, but the preferred break path also extends beyond one or more of the following: the first center line or the second center line.

For simplicity and ease of explanation, the rocket's trajectory shown in this example is perfectly vertical. Naturally, a rocket's trajectory can follow any path (e.g., with some angular offset relative to a vertical axis) while still employing the various techniques described in this figure and other examples.

A preferred break path may be created or otherwise formed in a composite material using a variety of techniques. The following figure shows one example.

Figure 3A:
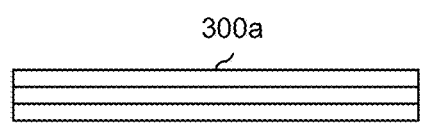
FIG. 3A is a side view illustrating an embodiment of a composite material with three layers before a preferred break path is created.

FIG. 3A is a side view illustrating an embodiment of a composite material with three layers before a preferred break path is created. In this example, a preferred break path will be formed in the composite material (300a). For simplicity and ease of explanation, only one preferred break path is formed in this example although naturally multiple preferred break paths may be created simultaneously.

Figure 3B:
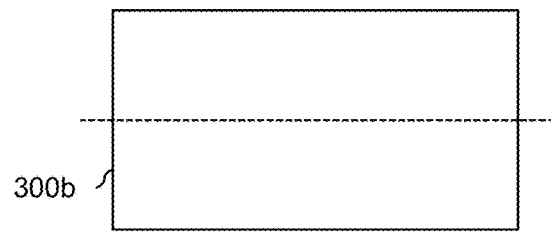
FIG. 3B is a top view illustrating an embodiment of a composite material before a preferred break path is created.

FIG. 3B is a top view illustrating an embodiment of a composite material before a preferred break path is created. In this example, the composite material (300b) is in the same state as that shown in FIG. 3A.

Figure 3C:
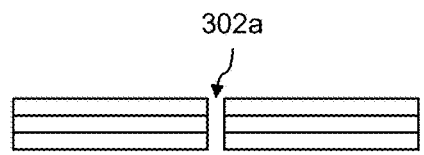
FIG. 3C is a side view illustrating an embodiment of a composite material after the composite material is cut.

FIG. 3C is a side view illustrating an embodiment of a composite material after the composite material is cut. In the state shown here, a cut (302a) is formed in the composite material.

Figure 3D:
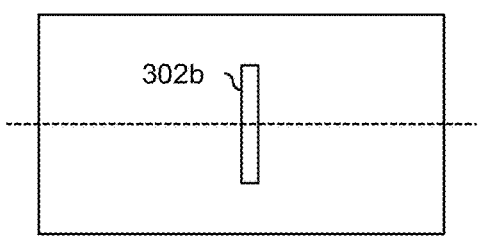
FIG. 3D is a top view illustrating an embodiment of a composite material after the composite material is cut.

FIG. 3D is a top view illustrating an embodiment of a composite material after the composite material is cut. In this example, the composite material in the same state as that shown in FIG. 3C with cut (302b) is shown from above.

Figure 3E:
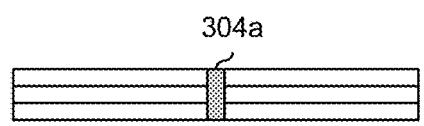
FIG. 3E is a side view illustrating an embodiment of a composite material after the cut in the composite material is filled with an adhesive.

FIG. 3E is a side view illustrating an embodiment of a composite material after the cut in the composite material is filled with an adhesive. In this example, the cut in the composite material has been filled with an adhesive (304a) such as adhesives that are suitable for wet lay-ups of composites. Such adhesives tend to be fairly brittle and are designed to bond to the composite materials used. Using an adhesive-filled cut may be attractive because it seals off the interior of the airframe so that water or debris cannot enter the airframe.

Figure 3F:
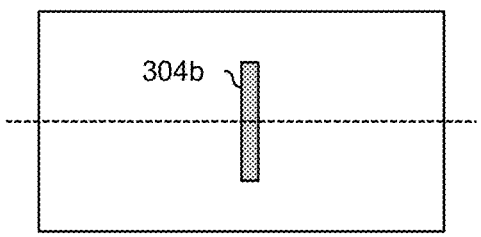
FIG. 3F is a top view illustrating an embodiment of a composite material after the cut in the composite material is filled with an adhesive shown from above.

FIG. 3F is a top view illustrating an embodiment of a composite material after the cut in the composite material is filled with an adhesive shown from above. In this example, the composite material in the same state as that shown in FIG. 3E with the adhesive-filled cut (304b) is shown from above. In this example, the adhesive-filled cut (304b) offers sufficient structural robustness (e.g., against someone leaning against the adhesive-filled cut, against something being placed on the adhesive-filled cut, etc.) until the rocket is ignited.

In some cases, it may be desirable to adjust the structural robustness (i.e., the amount of kinetic energy required to break the preferred break path) of the preferred break path. The following figures show some examples of how this parameter may be tuned or adjusted as desired.

Figure 3G:
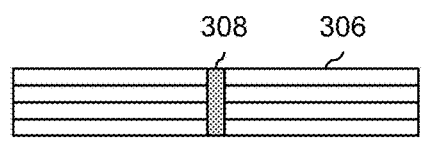
FIG. 3G is a side view illustrating an embodiment of a preferred break path which includes four layers.

FIG. 3G is a side view illustrating an embodiment of a preferred break path which includes four layers. In the example shown, the composite material (306) has four layers whereas the composite layer in the previous examples has three layers (see, e.g., FIG. 3A, FIG. 3C, and FIG. 3E). The increased number of composite layers means that the height of the adhesive (308) in the cut is taller. Increasing the height of the adhesive in the vertical direction increases the amount of kinetic energy required to break through that adhesive-filled cut. In other words, the structural robustness can be adjusted as or if desired by changing the number of layers in the composite material.

Figure 3H:
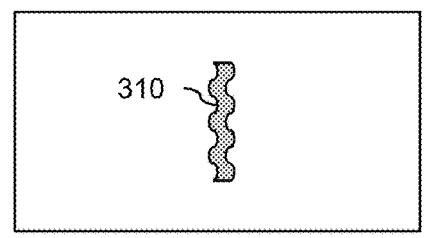
FIG. 3H is a top view illustrating an embodiment of a non-linear preferred break path.

FIG. 3H is a top view illustrating an embodiment of a non-linear preferred break path. In this example, the length of the preferred break path has been increased by implementing the preferred break path (310) as a curvy, back-and-forth path as opposed to a straight line. Increasing the length of the path improves the structural robustness of the preferred break path. In some embodiments, rounded edges are desirable because they reduce abrasion on the canopy. In weight-constrained (e.g., ultralight) applications, strengthening the preferred break path using the technique shown in FIG. 3H may be desirable over that shown in FIG. 3G because the former does not noticeably add to the weight whereas the latter does add noticeably to the weight (e.g., because the additional weight from an additional layer is more significant than additional adhesive). As shown herein, in some embodiments, the preferred break path includes a section that is not straight.

As shown in FIGS. 3A-3H, in some embodiments, the preferred break path includes an adhesive-filled cut. In some embodiments (not shown here), the preferred break path includes a plurality of adhesive-filled perforations. The intact portions of the composite material along the preferred break path act to increase (e.g., slightly) the amount of kinetic energy required to break through the preferred break path but overall it is still easier to break the composite material along the preferred break path compared to other parts of the composite material. There may be other techniques for forming or otherwise creating a preferred break path and/or preferred break point (some of which are described below). In some embodiments, a preferred break path and/or a preferred break point is formed or otherwise created by assembling pre-cut pieces of pre-preg and then curing. Pre-preg is carbon fabric that come already soaked with the right amount of resin. There is just enough resin that the pre-cut edges are bonded together with resin, and no continuous fiber bridges the cut. In one example developmental cycle, once the design is locked in on a part and all of the flat patterns have been figured out, this construction technique may be easier than the cut-and-fill technique.

The embodiments described above are independent of each other and may be used separately or in combination together as or if desired.

Figure 4:
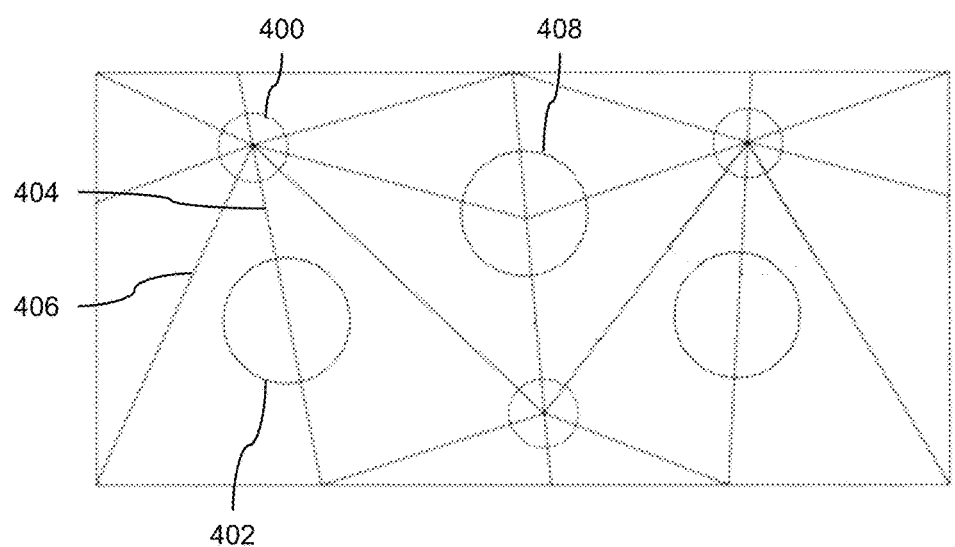
FIG. 4 is a diagram illustrating an embodiment of preferred break points and preferred break paths for a vehicle with three ballistic parachute systems.

FIG. 4 is a diagram illustrating an embodiment of preferred break points and preferred break paths for a vehicle with three ballistic parachute systems. In the example shown, the vehicle has three ballistic parachute systems, each with its own rocket and canopy. The locations of the rocket canisters beneath the surface are indicated by the smaller circles (see, e.g., 400) and the locations of the canopy canisters beneath the surface are indicated by the larger circles (see, e.g., 402). The positions of the circles (i.e., canister locations) are selected or otherwise positioned to minimize the likelihood of a rocket collision. For example, the three rocket paths form an upside-down tripod (i.e., where the rockets move away from each other so that they do not collide).

In this example, some of the preferred break paths pass through the center of both canisters (see, e.g., preferred break path 404) whereas other preferred break paths only pass through one center (see, e.g., preferred break path 406). As shown here, in some embodiments, there is a second preferred break point located in the airframe over the opening of the canopy canister (see, e.g., the preferred break point at the center of canopy canister 408). In some other embodiments, a canopy canister does not have a preferred break point at its center (see, e.g., canopy canister 402). In this example, some of the preferred break paths were selected or otherwise routed to help the hatch break off into pieces that are more likely to fly away from the vehicle (e.g., so as not to inhibit or otherwise interfere with the parachute). For this particular design objective (i.e., producing pieces which fly away from the vehicle), having the lines meet over the canopy canister is believed to help with this. The pattern shown here is merely one example and is not intended to be limiting.

Returning briefly to the example shown in FIGS. 2A-2C, in that example, there is a single preferred break point (216a-216c) and it is located above the center of the opening of the rocket canister (230 in FIG. 2B). In some embodiments, there are two preferred break points. The following figures show an example of this.

FIG. 5A is a top view showing an embodiment of a composite material with two preferred break points. In the example shown, dotted circle 500 shows where the opening of the rocket canister is located beneath the composite material and dotted circle 502 shows where the opening of the canopy canister is located beneath the composite material. A first preferred break point (504a) is located at the center of the rocket canister's opening (500). A second preferred break point (506a) is located at the center of the canopy canister's opening (502). As will be described in more detail below, preferred break path 508a (which runs between the two preferred break points above the center of the canisters) is used by the rocket-canopy line to more easily break through the composite material (if it has not already been broken by the kinetic energy of the rocket) after the rocket has broken through the composite material but before the canopy is free.

FIG. 5B is a side view showing an embodiment a composite material with two preferred break points after a rocket has broken through. FIG. 5B continues the example of FIG. 5A. For clarity and readability, the only preferred break path 508b, which runs between the two preferred break points (504b and 506b), is shown in this figure.

In the state shown here, the rocket (520b) has ignited and has broken through the composite material. Due to the preferred break paths which radiate outward from preferred break point 504b above the rocket canister, flaps 522b, 524b, and 526b are formed when the rocket breaks the composite material along the preferred break lines. In FIG. 5A, those flaps correspond to flaps 522a, 524a, and 526a, respectively. Returning to FIG. 5B, the preferred break line 508b between the two preferred break points (504b and 506b) is only partially broken, and so the entirety of flap 522a shown in FIG. 5A is not released yet.

FIG. 5C is a side view showing an embodiment of a composite material as a rocket-canopy line breaks through a preferred break path which ends at two preferred break points. As shown here, as the rocket-canopy line (540c) continues to be pulled by the rocket (520c), the line rubs against parts of the composite material that have not yet broken (e.g., towards the part of the composite material over the canopy canister). Preferred break path 508c (which runs from the preferred break point) permits the rocket-canopy line (540c) to more easily break through the composite material where it was not already broken. Note for example, that in the state shown here, the entirety of preferred break path 508c has broken, so that all of flap 522c is folded back. For simplicity and ease of explanation, flaps 524c and 526c do not change position from the previous figure in this example.

FIG. 5D is a side view showing an embodiment of a composite material after a canopy breaks through. As the rocket (520d) continues to fly upward, the rocket-canopy line is pulled until there is no longer any slack, at which point the canopy (560) will be pulled out of the canopy canister (not shown). The preferred break lines above the opening of the canopy canister permit the canopy to more easily break through the composite material. Flaps 562d and 564d (which were not open in FIG. 5C) are now open. For context, FIG. 5A shows corresponding flaps 562a and 564a, respectively.

Another consideration (e.g., in addition to the amount of kinetic energy to break through an airframe made of composite material) is whether the remnants of the broken airframe will snag and/or tear the lines or canopy as they go by. To address this, FIG. 5A includes a cutout or section (510) which includes material(s) which will not snag and/or tear the lines and/or canopy. In one example, that part (510) of the composite material is made of Kevlar which is very smooth (i.e., much less stiff) than (as an example) carbon fibers, so the broken edge of the hatch is fuzzy, not splintery. As a result, the Kevlar edges will not snag or tear the lines or canopy. However, Kevlar may not be desirable for the rest of the airframe and so only the part of the airframe that covers the ballistic parachute system is made of Kevlar.

In some embodiments, the preferred break paths and/or preferred break points are created so that the resulting flaps or remnants have smooth edges to avoid snagging or tearing the lines and/or canopy. The following figure shows an example of this.

Figure 6A:
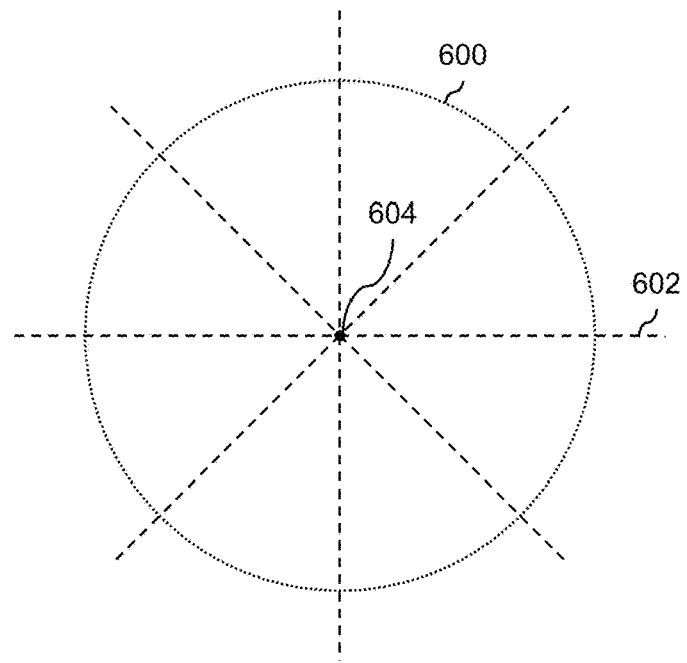
FIG. 6A is a diagram illustrating an embodiment of a preferred break point and preferred break paths which produce flaps with sharp tips when broken.

FIG. 6A is a diagram illustrating an embodiment of a preferred break point and preferred break paths which produce flaps with sharp tips when broken. For context, the opening of the canister (e.g., the canopy canister) beneath the composite material is shown as dotted circle 600. In this example, all of the preferred break paths (602) are straight lines intersecting at the middle of the dotted circle (600) to produce a relatively small preferred break point (604). As a result of this, the flaps or remnants formed from the preferred break paths (602) all have sharp and/or pointy tips. These sharp points can snag on and/or tear the lines and/or canopy as they go by. To address this, material which is smooth, reducing the likelihood of catching or tearing the lines and/or canopy, is used in some embodiments.

In some embodiments, to prevent snags and/or tears from occurring (e.g., even if smooth materials are used in the composite material), the preferred break point is shaped so that it produces flaps or remnants with rounded tips or edges. The following figure shows an example of this.

Figure 6B:
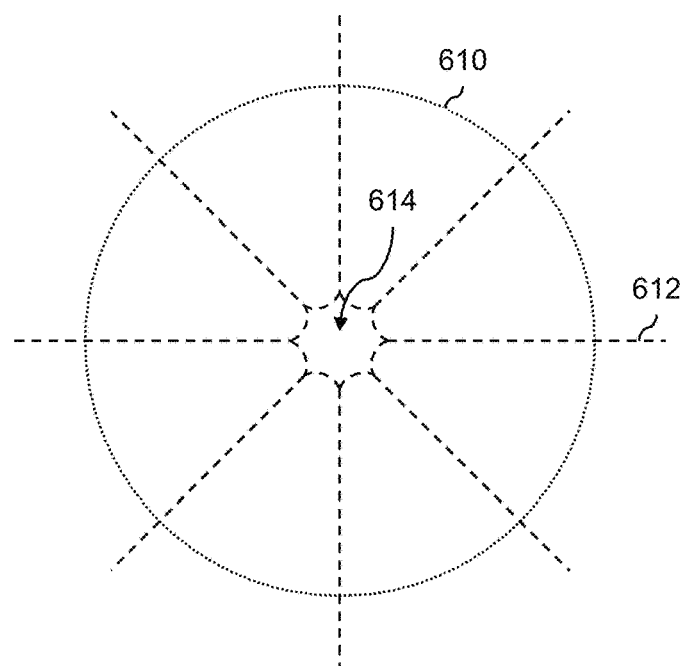
FIG. 6B is a diagram illustrating an embodiment of a preferred break point and preferred break paths which produce flaps with rounded tips when broken.

FIG. 6B is a diagram illustrating an embodiment of a preferred break point and preferred break paths which produce flaps with rounded tips when broken. In this example, the preferred break paths (612) stop short of the center of the dotted circle (610) and do not intersect in the center. Rather, the preferred break point (614) in this example is an enclosed area that is formed from a plurality of curved edges (more specifically, concave edges when looking radially inwards). These curved edges which define the perimeter of the preferred break point produce rounded tips on the triangular flaps which form after the rocket (not shown) breaks through the composite material. The resulting rounded tips or edges of the flaps are less likely to snag and/or tear the lines and/or canopy, which is undesirable with a ballistic parachute system. For this reason, in some embodiments, the preferred break point (e.g., and in particular, a preferred break point over a canopy canister) is an enclosed area formed by a plurality of concave edges.

The following figure shows an example of how such a preferred break point may be formed.

Figure 7A:
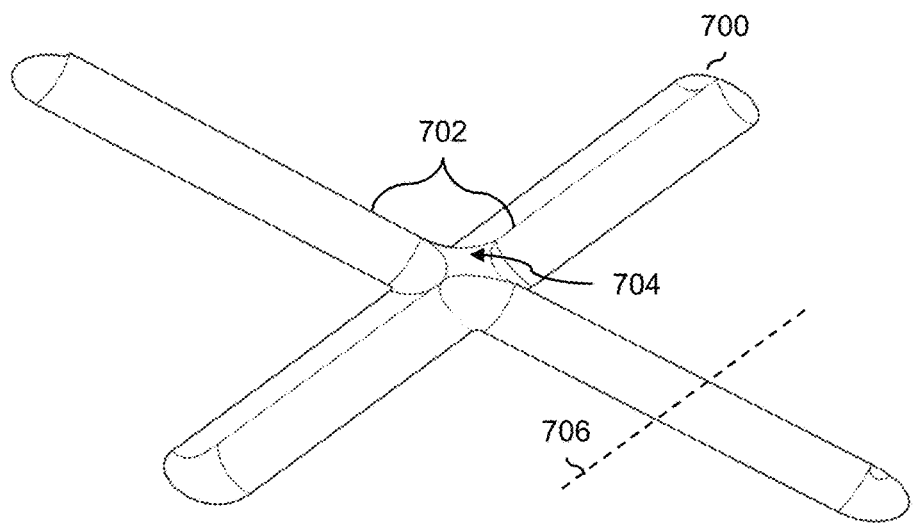
FIG. 7A is a diagram illustrating an embodiment of a mold surface used to create a preferred break point and preferred break paths.

FIG. 7A is a diagram illustrating an embodiment of a mold surface used to create a preferred break point and preferred break paths. In this example, mold surface 700 is a three dimensional mold surface which forms two intersecting preferred break paths using two intersecting ridges (702) and a preferred break point using a 4-point "star" shape (704) where the ridges intersect. The 4-point "star" shape of the preferred break point produces four flaps with rounded tips and (as described above) reduces the likelihood of tearing or snagging one of the lines and/or the canopy as they exit the interior of the airframe.

When the airframe is formed, the mold surface causes the resulting composite material to have a consistent wall thickness but the bending of the fibers over this geometry of mold surface (e.g., the "ridges" of the mold surface) results in the stresses in those fibers, so they are closer to breaking when a load is applied. These depressions form the preferred break paths (702) and the preferred break point (704) which require less kinetic energy to break through compared to flat portions of the composite material. The following figure shows an example cross section of the formed composite material corresponding to cross section 706.

Figure 7B:
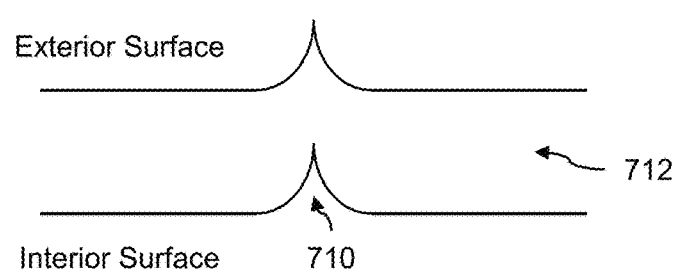
FIG. 7B is a diagram illustrating an embodiment of a composite material formed using a mold surface.

FIG. 7B is a diagram illustrating an embodiment of a composite material formed using a mold surface. In this example, a cross section at 706 of the composite material formed using the mold surface shown in FIG. 7A is shown. As shown here, composite with a consistent wall thickness is produced with a channel (710) corresponding to where the mold surface has a "ridge". This channel or depression in the composite material will be easier to break through compared to the flat part of the produced composite material and therefore forms a preferred break path.

In some embodiments, the composite material (712) is formed using a thin version of a sheet molding compound (SMC). Conventional composite material is formed using fabric with continuous fibers that run from end to end. Sheet molding compound, in contrast, has much shorter threads or fibers. For a given or similar thickness of fabric, SMC is easier to break through compared to some other materials because of its shorter fibers. Traditional (i.e., thicker) SMCs are much thicker than fabric (e.g., on the order of 5+ plys of fabric). This is because they are primarily used to make molds where weight is less important and conformability is more important. It is noted that forming an SMC material over the mold surface shown in FIG. 7A one a way to create a preferred break point or path, but SMC is not necessarily critical to embodiments with mold surfaces (e.g., as shown in FIG. 7A).

For context, it may be useful to show an example vehicle which uses the techniques described herein. The following figures show one such example.

Figure 8A:
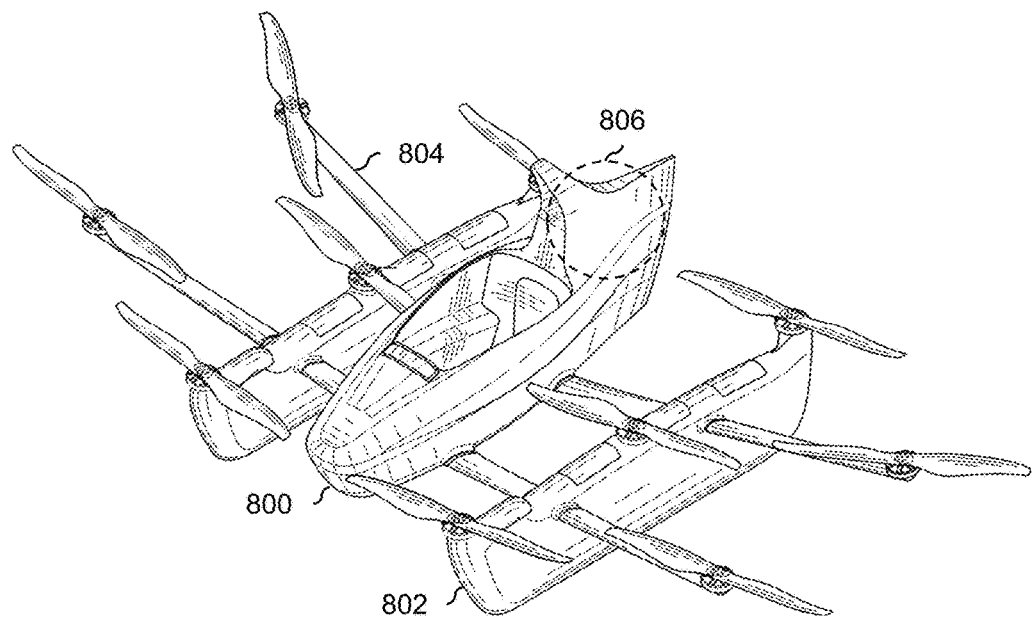
FIG. 8A is a diagram illustrating an embodiment of a multicopter with a composite fuselage and a ballistic parachute system.

FIG. 8A is a diagram illustrating an embodiment of a multicopter with a composite fuselage and a ballistic parachute system. In this example, the multicopter is an ultralight with strict weight limitations. To keep the weight of the aircraft down, the fuselage (800) and other parts of the airframe are made of a composite material. The aircraft has two floats (802) which run from front to back and two booms (804) which extend laterally outwards from the fuselage and through the booms. As shown here, the floats (802) and the booms (804) are not shaped like wings and therefore do not provide any aerodynamic lift. To put it another way, the example aircraft cannot glide down and land if there is an emergency. As such, to handle any emergency landing, the aircraft includes a ballistic parachute system behind the seat in the back of the fuselage (806) behind the pilot's seat. The multicopter shown here flies at relatively low altitudes; to ensure the canopies inflate as quickly as possible at such low altitudes, rockets are used to inflate the canopies. The following figure shows the placement of the canopy canisters and the rocket canisters in this example.

Figure 8B:
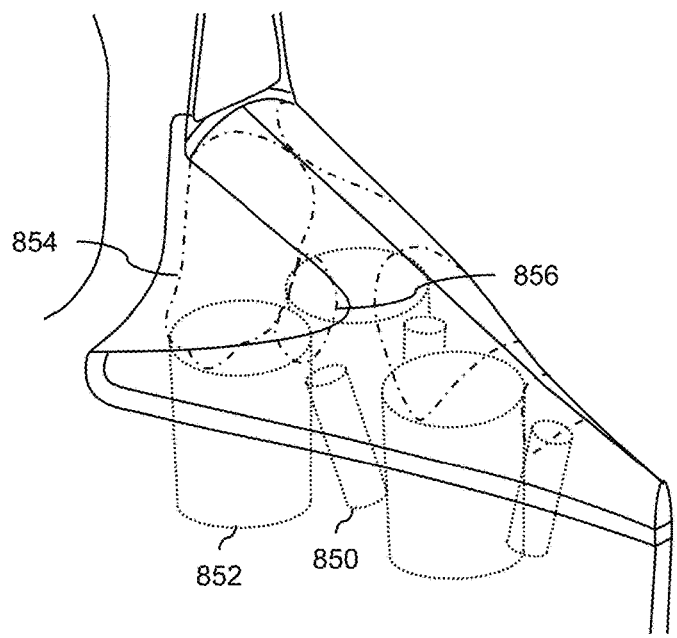
FIG. 8B is a diagram illustrating an embodiment of the back panel of a fuselage which covers three canopy canisters and three rocket canisters in the back of a fuselage.

FIG. 8B is a diagram illustrating an embodiment of the back panel of a fuselage which covers three canopy canisters and three rocket canisters in the back of a fuselage. In this example, the smaller cylinders (850) show the rocket canisters and the larger cylinders (852) show the canopy canisters within the airframe. For context and reference, the parts of the airframe that are above the openings of the canisters (i.e., and the area which the rocket and canopy of the ballistic parachute system will pass as they exit the airframe) are shown using dashed and dotted lines. For example, the larger outlines (see, e.g., outline 854) show the part of the airframe above the openings of the canopy canisters (see, e.g., canopy canister 852) and the smaller outlines (see, e.g., outline 856) show the part of the airframe above the opening of the rocket canisters (see, e.g., rocket canister 850). It is noted that these regions are not necessarily discernable from the exterior of the vehicle (i.e., the surface may be smooth without any indication of these regions). Furthermore, there is not necessarily some cutout or panel corresponding to the parts of the aircraft where the rocket or canopy exits (e.g., outline 854). Rather, these regions are conceptual and correspond to the circular openings of the canister superimposed on the irregular surface of the vehicle behind the seat.

Although it may not necessarily be discernable from the outside, these regions (e.g., 854 and/or 856) may be of lower layer count than the surrounding airframe structure so that they are still easier to break through. By having the surrounding air frame have a higher layer count, this permits sections or areas that are easier to break through while still maintaining the structural integrity (e.g., in other areas and/or when considering the airframe as a whole).

Irregularly shaped surfaces may further impede the rocket in breaking through the fuselage when ignited. The following figures describe an example of this problem and a device disposed on the interior surface for such situations.

Figure 9A:
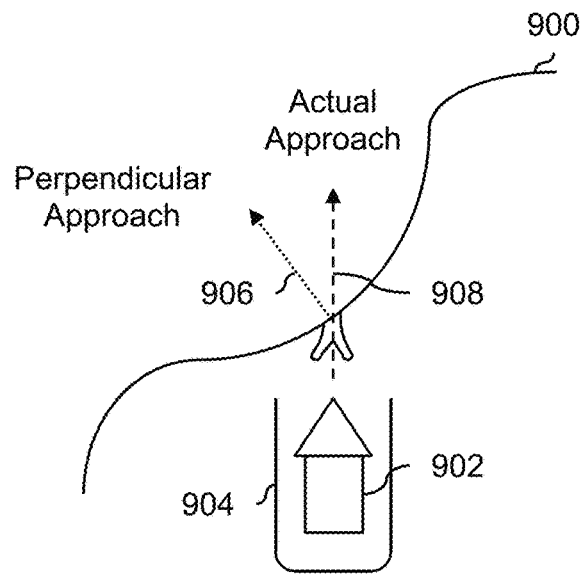
FIG. 9A is a diagram illustrating an embodiment of a puncturer used to break through composite material.

FIG. 9A is a diagram illustrating an embodiment of a puncturer used to break through composite material. In the example shown, the composite material (900) is curved above the rocket (902) and rocket canister (904) (e.g., for aerodynamic reasons, for aesthetics, for weight reasons, etc.). The idea approach angle for the rocket to break through the composite material is at a perpendicular angle to the surface where the rocket makes contact with the composite material. See, for example, perpendicular approach 906. However, the actual approach angle of the rocket is 908, which is not the same approach angle as the more desirable perpendicular approach (906). As a result, more kinetic energy is required to break through the composite material than would be required if the rocket instead had a perpendicular approach.

To help the rocket break through the composite material, a puncturer is placed on the interior surface of the composite material at or near where the rocket will make contact with the composite material. The puncturer opens outward with its opening towards the rocket. The rocket, when launched, will be "caught" by the downward-facing opening of the puncturer. The puncturer is designed to puncture the composite material and (as an example) is made of a hard material and/or has a sharp point which helps it break through the composite material. The rocket pushes the puncturer up and through the composite material, breaking the composite material. ? The puncturer helps the rocket maintain its designed trajectory, regardless of the geometry of the interior hatch surface. With especially shear interior surfaces, redirection of the rocket's trajectory was a concern. The following figure shows a close up view of the exemplary puncturer.

Figure 9B:
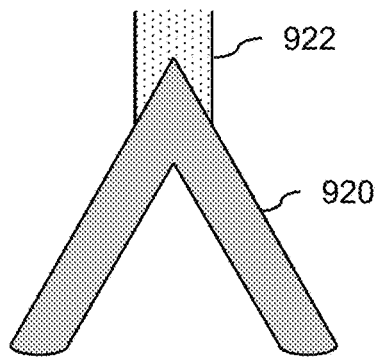
FIG. 9B is a diagram illustrating an embodiment of a puncturer which includes a hard and sharp point and collapsible section.

FIG. 9B is a diagram illustrating an embodiment of a puncturer which includes a hard and sharp point and collapsible section. FIG. 9B shows a close up view of the exemplary puncturer shown in FIG. 9A. The downward facing portion (920) is made of a material that is harder than the composite material and thus helps to puncture the composite material. Some examples include metal, a rigid plastic, etc. The downward facing portion (920) has a sharp tip at the top to help puncture the composite material. In some embodiments, the downward facing portion (920) is V-shaped. In some other embodiments, it is a cone.

To connect the downward facing portion (920) to the composite material of the airframe (in this example, a fuselage, which is not shown), there is an intervening section (922) which is made of a material that is relatively easy to collapse and/or break such as plastic. This part may be shaped as desired to help attach the puncturer to the interior surface of the airframe.

In some embodiments, a puncturer on the interior surface is used in combination with preferred break point(s) and/or preferred break path(s). For example, the puncturer may be located at a preferred break point so that both the puncturer and the preferred break point make it easier for the rocket to break through the composite material. Or, in some embodiments, a puncturer is used by itself (i.e., there is no preferred break point(s) and/or preferred break path(s)).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a ballistic parachute system which includes:
   a rocket which sits in a rocket canister having an opening; and
   a canopy which sits in a canopy canister having an opening; and
an airframe which includes a composite material, wherein the airframe further includes:
   a preferred break point in the airframe, wherein:
      the airframe covers the ballistic parachute system; and
      the preferred break point is located in the airframe over the opening of the rocket canister; and
   a preferred break path in the airframe located at least partially over the opening of the rocket canister and at least partially over the opening of the canopy canister.

2. The system recited in claim 1, wherein the preferred break path runs through: (1) a first center line associated with the rocket canister and (2) a second center line associated with the canopy canister.

3. The system recited in claim 1, wherein:
the preferred break path runs through: (1) a first center line associated with the rocket canister and (2) a second center line associated with the canopy canister; and
the preferred break path extends beyond one or more of the following: the first center line or the second center line.

4. The system recited in claim 1, wherein the preferred break path includes an adhesive-filled cut.

5. The system recited in claim 1, wherein the preferred break path includes a plurality of adhesive-filled perforations.

6. The system recited in claim 1, wherein the preferred break path includes a section that is not straight.

7. The system recited in claim 1, wherein the preferred break point is formed by an intersection of two or more preferred break paths.

8. The system recited in claim 1, wherein there is a second preferred break point located in the airframe over the opening of the canopy canister.

9. The system recited in claim 1, wherein the preferred break point is an enclosed area formed by a plurality of concave edges.

10. The system recited in claim 1, wherein:
there is a second preferred break point located in the airframe over the opening of the canopy canister; and
the second preferred break point is an enclosed area formed by a plurality of concave edges.

11. The system recited in claim 1, wherein the preferred break path includes a channel.

12. The system recited in claim 1, wherein:
the preferred break path includes a channel; and
the channel is formed using a short molding compound (SMC).

13. The system recited in claim 1, wherein the airframe further includes a puncturer that is coupled to an interior surface of the airframe over the opening of the rocket canister and is configured to puncture the interior surface of the airframe.

14. A method, comprising:
providing a preferred break point in an airframe, wherein:
   there is a ballistic parachute system which includes a rocket which sits in a rocket canister having an opening and a canopy which sits in a canopy canister having an opening, the airframe includes a composite material, the airframe covers the ballistic parachute system, and the preferred break point is located in the airframe over the opening of the rocket canister; and
providing a preferred break path in the airframe located at least partially over the opening of the rocket canister and at least partially over the opening of the canopy canister.

15. The method recited in claim 14, wherein the preferred break path runs through: (1) a first center line associated with the rocket canister and (2) a second center line associated with the canopy canister.

16. The method recited in claim 14, wherein:
the preferred break path runs through: (1) a first center line associated with the rocket canister and (2) a second center line associated with the canopy canister; and
the preferred break path extends beyond one or more of the following: the first center line or the second center line.

17. The method recited in claim 14, wherein there is a second preferred break point located in the airframe over the opening of the canopy canister.

18. The method recited in claim 14, wherein the preferred break point is an enclosed area formed by a plurality of concave edges.

19. The method recited in claim 14, wherein:
there is a second preferred break point located in the airframe over the opening of the canopy canister; and
the second preferred break point is an enclosed area formed by a plurality of concave edges.

20. The method recited in claim 14, wherein:
the preferred break path includes a channel; and
the channel is formed using a short molding compound (SMC).

21. The method recited in claim 14, wherein the airframe further includes a puncturer that is coupled to an interior surface of the airframe over the opening of the rocket canister and is configured to puncture the interior surface of the airframe.

* * * * *